United States Patent [19]
Chatterjee et al.

[11] Patent Number: 5,683,649
[45] Date of Patent: Nov. 4, 1997

[54] METHOD FOR THE FABRICATION OF MICRO-ELECTROMECHANICAL CERAMIC PARTS

[75] Inventors: Dilip Kumar Chatterjee, Rochester; Edward Paul Furlani, Lancaster; Syamal Kumar Ghosh, Rochester, all of N.Y.

[73] Assignee: Eastman Kodak Company, Rochester, N.Y.

[21] Appl. No.: 751,529

[22] Filed: Nov. 14, 1996

[51] Int. Cl.⁶ .................................................. C04B 41/00
[52] U.S. Cl. .......................... 264/619; 264/635; 264/643
[58] Field of Search ............................. 264/614, 618, 264/619, 635, 643

[56] References Cited

U.S. PATENT DOCUMENTS

| | | | |
|---|---|---|---|
| 4,994,215 | 2/1991 | Wiech, Jr. | 264/27 |
| 5,240,671 | 8/1993 | Carey | 419/9 |

*Primary Examiner*—Christopher A. Fiorilla
*Attorney, Agent, or Firm*—Edward Dugas

[57] ABSTRACT

Micro-electromechanical ceramic parts are formed using green ceramic and a sacrificial material that has a higher melting temperature than the sintering temperature of the green ceramic to form electrical trace paths. After the sintering of the ceramic part the sacrificial material is removed by etching or by elevating the temperature of the part above the melting temperature of the sacrificial material. The void left by the removal of the sacrificial material is then filled with a molten metal which when cooled forms the electrical trace for the fabricated part.

8 Claims, 6 Drawing Sheets

METHOD FOR THE FABRICATION OF MICRO-ELECTROMECHANICAL CERAMIC PARTS

FIELD OF THE INVENTION

This invention relates generally to the field of micro-electromechanical devices, and in particular to a method for fabricating micro-molded electromechanical devices from ceramic.

BACKGROUND OF THE INVENTION

Conventional electromechanical devices are greater than 1 cubic centimeter in volume. The materials and methods for the fabrication of these devices are inadequate for the fabrication of micro-electromechanical devices which are less than 1 cubic centimeter in volume. However, such microdevices can be fabricated using micromolded ceramic technology. One drawback to this approach is that electromechanical devices such as motors and actuators typically utilize energized coils to implement the motion of a permanent magnet or vice versa. For microdevices, these coils need to be on the order of 100 microns in diameter or less, and they need to be attached to, or embedded in, the micromolded sintered ceramic piece. However, highly conductive materials such as copper or gold have a melting point below the sintering temperature, and therefore cannot be embedded before sintering.

The method of the present invention provides a solution to this problem.

SUMMARY OF THE INVENTION

The present invention is directed to overcoming one or more of the problems set forth above. Briefly summarized, according to one aspect of the present invention there is provided a method for fabricating a ceramic micro-electromechanical part with an electrically conductive trace comprising the steps of:

a) forming a sacrificial trace material, having a melting temperature greater than the sintering temperature of the ceramic material to be used to mold the ceramic micro-electromechanical part into a trace of the part's electrical conductor;

b) forming green ceramic material into the shape of the ceramic micro-electromechanical part incorporating said formed sacrificial trace material;

c) sintering the green ceramic material;

d) removing the sacrificial trace material from the sintered ceramic device;

e) flowing molten electrically conductive material into the space relinquished by the removed sacrificial trace material; and f) cooling the molten electrically conductive material to fabricate the ceramic micro-electromechanical part with the electrically conductive trace.

The subject of this invention is a novel process for fabricating micromolded ceramic parts with electrical traces for use in micro-electromechanical devices such as solenoids and motors. The approach is to embed a sacrificial refractory materials such as tungsten (w), molybdenum (Mo), or Tantalum (Ta), which have a melting point above the sintering temperature, in the ceramic part in the form of a desired conductor (trace) in the molded ceramic material when it is in the green state. Next, the ceramic material is sintered and the refractory material is etched out of the part leaving a path through the ceramic in the form of the desired trace. Lastly, electrically conductive materials are induced into the etched path using vacuum techniques. Thus, the resulting sintered ceramic part will have the desired electrical trace. A specific electromechanical device can be built up from this base part fabrication technology. The fabrication of a helical coil part that may form part of a solenoid or a motor is described in detail below.

These and other aspects, objects, features, and advantages of the present invention will be more clearly understood and appreciated from a review of the following detailed description of the preferred embodiment and appended claims, and by reference to the accompanying drawings.

ADVANTAGES EFFECT OF THE INVENTION

The present invention has the following advantages:

micro-electromechanical devices with built-in electrical traces can be fabricated on or with stable ceramic bases;

with micromolding, large numbers of the devices may be fabricated at one time; and because of the devices ceramic base they are able to withstand harsh operating environments.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

The method of the present invention will be described in conjunction with the fabrication of a specific component. This is byway of example only in that the teachings of the present method may be used to fabricate a wide range of micro-electromechanical components or devices.

Figure 1:
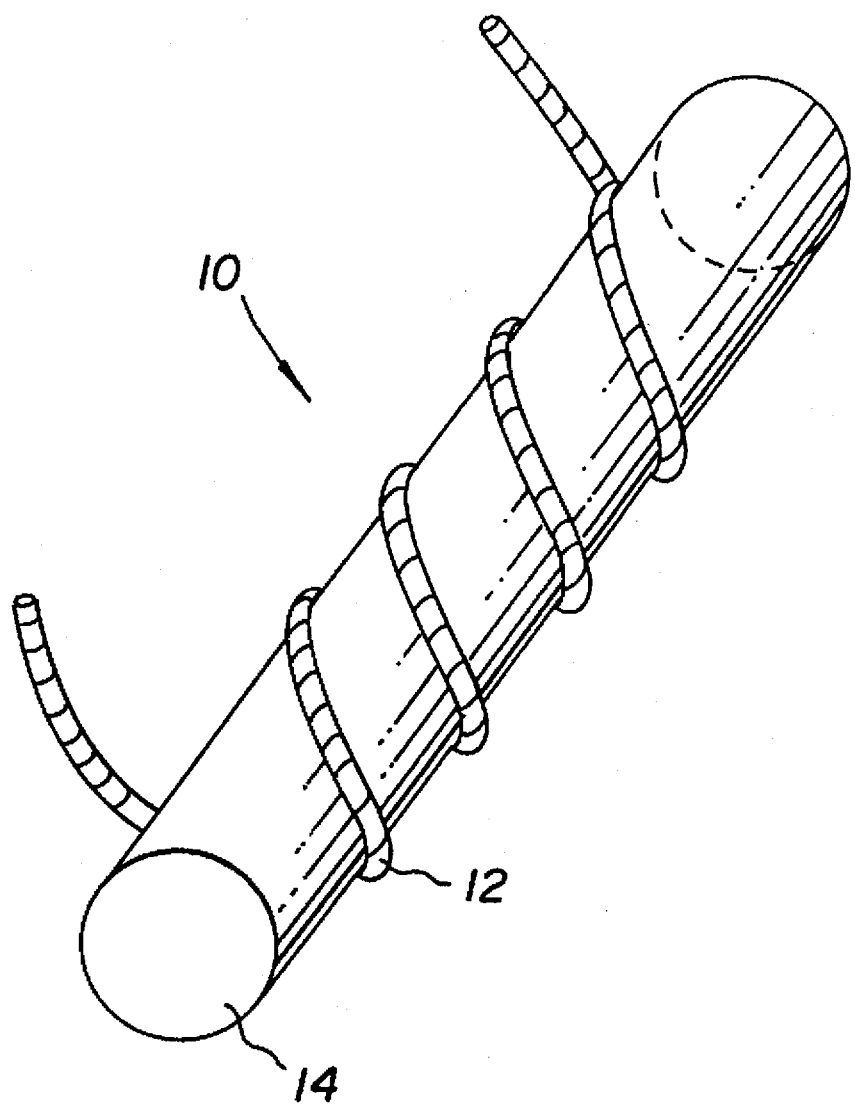
FIG. 1 is a perspective view of a micro-electromechanical device component.

Referring to FIG. 1, the micro-electromechanical component 10 chosen to teach the present method is comprised of a sacrificial fiber 12 wrapped in a helical fashion on a cylindrical ceramic bar 14. The sacrificial fiber 12 is made from refractory materials such as w, Mo, or Ta ans is on the order of 100 microns in diameter or less.

Figure 2A:
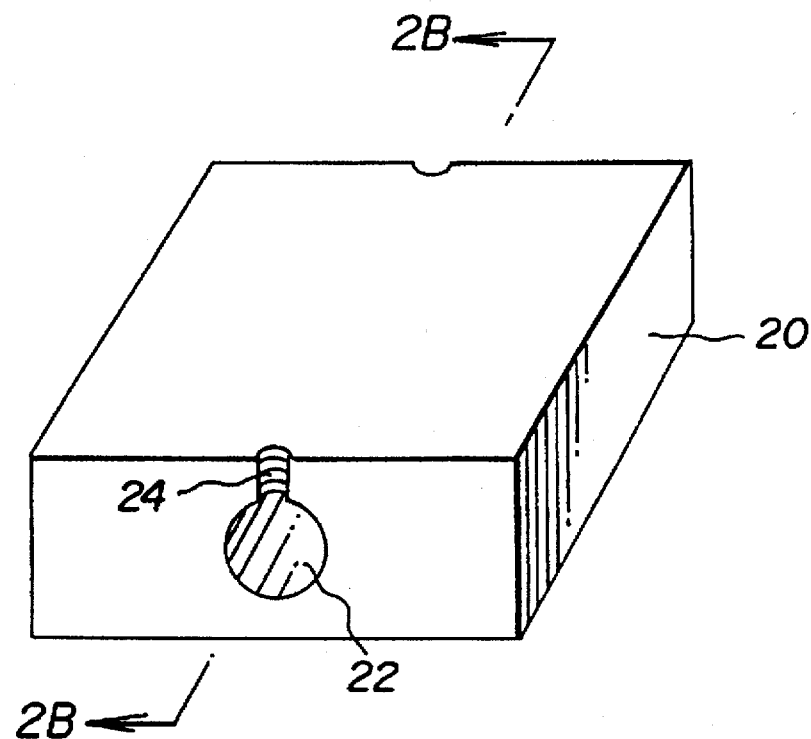
FIGS. 2A and 2B illustrates, in perspective view, a micromolded piece that is used to mold the component of FIG. 1, and a cross section of the micromolded piece taken along the section line B—B, respectively.
Figure 2B:
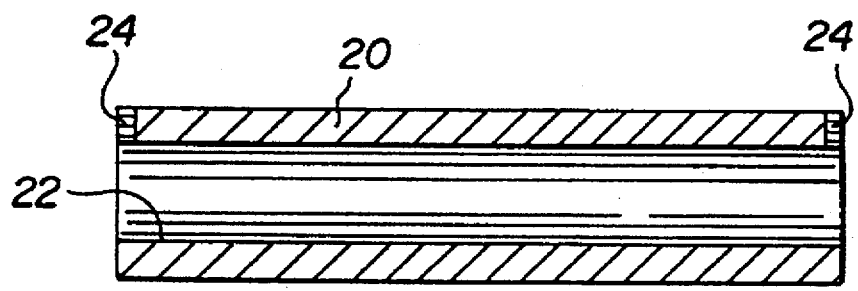

Referring to FIGS. 2A and 2B, illustrated in perspective and cross-sectional view respectively, a rectangular micromolded ceramic part 20, to be selected from highly insulating ceramics such as $Al_2$, $ZrO_2$, AlN, BN, MgO, $Al_2O_3$–$BrO_2$ components, etc., in a green state, is formed with a cylindrical cavity 22 and grooved paths 24 leading from the ends of the cavity 22 to the surface of the part. The fabrication of the micromolded ceramic part preferably takes place in a mold which duplicates the outer shape of the part, the grooved paths 24, and the cavity 22.

Figure 3A:
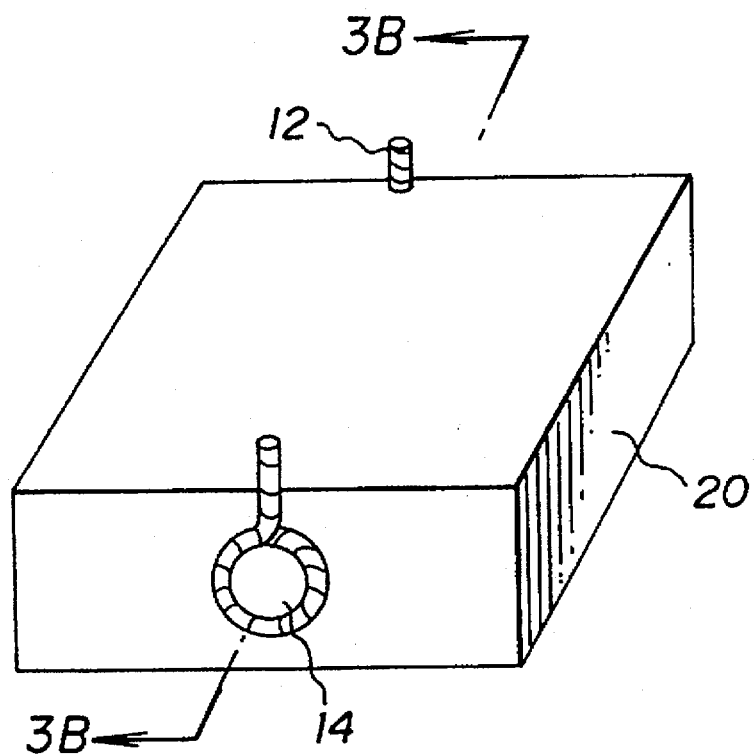
FIGS. 3A and 3B illustrate in perspective view the micromolded piece with the parts of the device component of FIG. 1 in place, and a cross section of the micromold taken along the section line B—B, respectively.
Figure 3B:
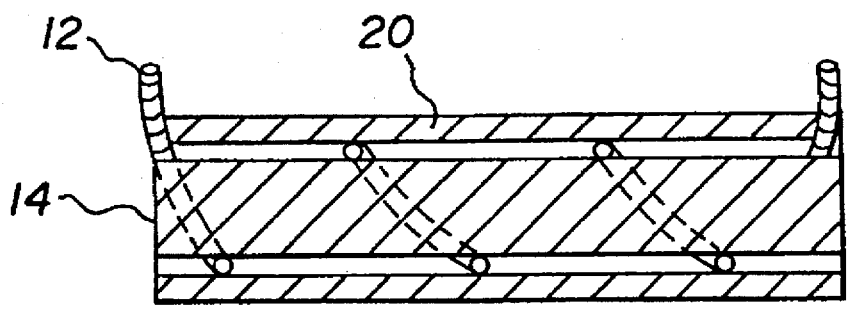

Referring next to FIGS. 3A and 3B, in the next step of the process, the sacrificial ceramic bar 14 and the sacrificial fiber 12 are inserted into the cylindrical cavity 22. It is instructive to note that the diameter of the cylindrical cavity 22 is large enough to accommodate the inserted ceramic bar 14 with the wrapped sacrificial fiber 12 with additional space to allow for 20 to 30% shrinkage of the cavity 22 upon sintering so as to preclude fracturing of the micromolded part 20 during the sintering process.

Figure 4A:
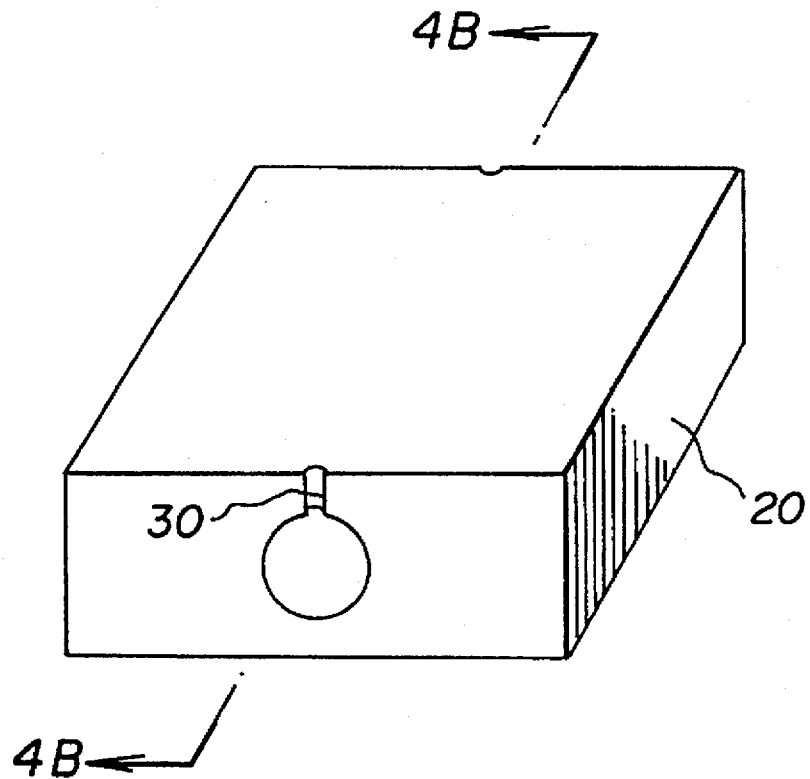
FIGS. 4A and 4B illustrate in perspective view the micromolded piece with the sintered ceramic material that forms a cylinder in place, and a cross section taken along the section line B—B, respectively.
Figure 4B:
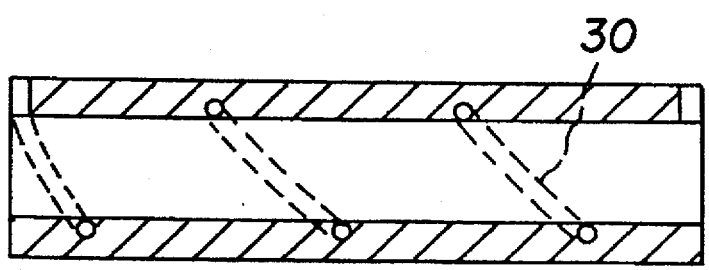

Referring now to FIGS. 4A and 4B, in the next step of the process, the assembly of FIGS. 3A and 3B is sintered and the embedded sacrificial helical fiber 12 is etched away leaving a helical trace path 30 through the ceramic part 20. The helical fiber 12 is etched away using ammonium hydroxide $NH_4OH$ or hydrochloric acid HCl.

Figure 5:
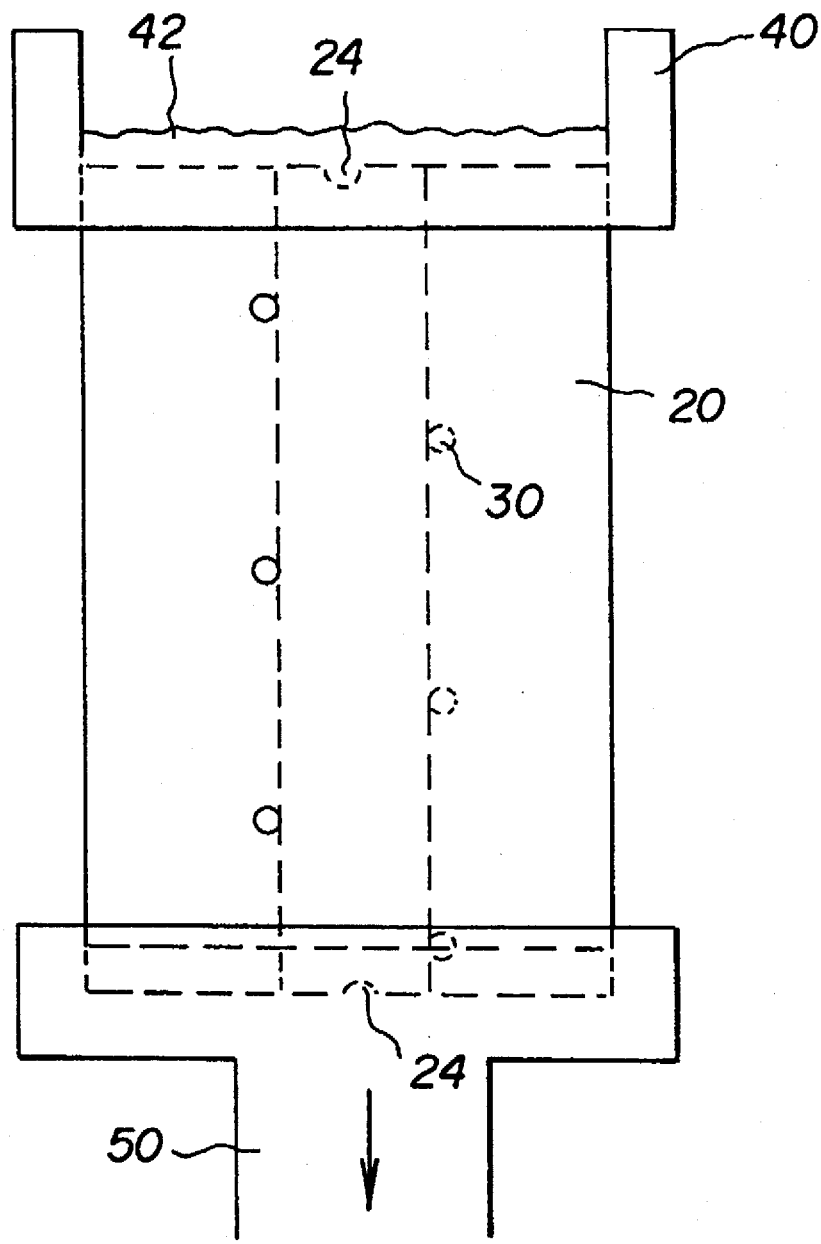
FIG. 5 illustrates the process of drawing a molten electrically conductive material into the traces formed by the removal of sacrificial material.

Referring now to FIG. 5, the micromolded ceramic part 20 with the etched helical trace path 30 is mounted in a vertical fashion with its top portion surrounded on all sides by a nonporous container 40 (dam) and a molten pool of electrically conductive metal alloy 42 such as Au, Ag, Ag—Cu, or Cu—Sn, or alternatively, a thin layer of conductive paste which is applied over the top of the ceramic part 20. The bottom of the part 20 is connected to a vacuum chamber 50 which is continually pumped so as to draw the molten metal alloy 42 or conductive paste through the helical trace path 30. In this way, the molten electrically conductive metal alloy 42 is made to fill the helical trace path 30 thereby forming an embedded helical coil trace of electrically conductive material in the part 20.

Figure 6A:
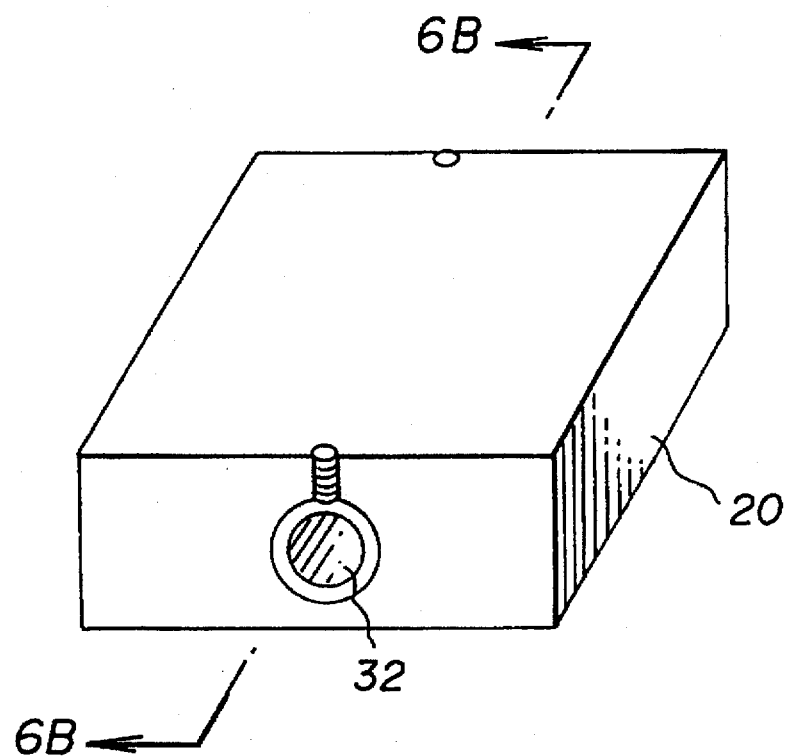
FIGS. 6A and 6B illustrate a perspective view of the micromolded piece with the molten electrically conductive material hardened and in place, and a cross section taken along the section line B—B, respectively.
Figure 6B:
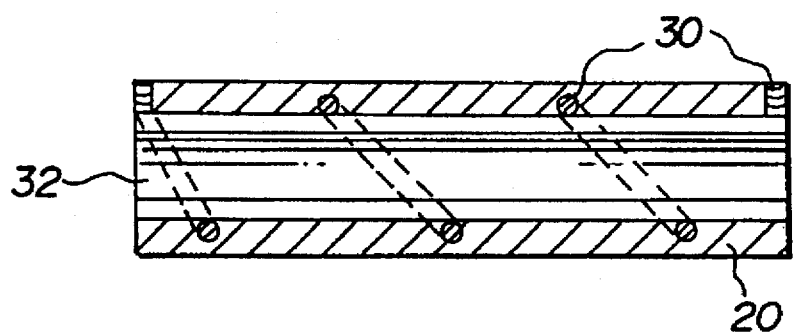

Referring now to FIGS. 6A and 6B, the micromolded ceramic part 20 with the embedded helical trace 30 is then subjected to a drilling operation to remove the cylindrical ceramic bar 14 so as to form a cylindrical cavity 32 that is concentric to the embedded helical trace 30. Alternatively, the cylindrical ceramic bar 14 can be chemically etched away preferentially with respect to the ceramic part 20. For example, the ceramic part 20 can be made using alumina or zirconia ceramic and the cylindrical ceramic bar 14 can be made using AlN or BN. This constitutes the finished part.

The invention has been described with reference to a preferred embodiment; However, it will be appreciated that variations and modifications can be effected by a person of ordinary skill in the art without departing from the scope of the invention.

PARTS LIST 10 micro-electromechanical component
12 sacrificial fiber
14 cylindrical ceramic bar
20 rectangular micromolded ceramic part
22 cylindrical cavity
24 grooved paths
30 helical trace path
32 cylindrical cavity
40 nonporous container
42 molten pool of electrically conductive metal alloy
50 vacuum chamber

We claim:

1. A method for fabricating a ceramic micro-electromechanical part with an electrically conductive trace comprising the steps of:

a) forming a sacrificial trace material, having a melting temperature greater than the sintering temperature of the ceramic material to be used to mold the ceramic part, into a trace of the part's electrical conductor;

b) forming green ceramic material into the shape of the ceramic part incorporating said formed sacrificial trace material;

c) sintering the green ceramic material;

d) removing the trace material from the sintered ceramic part;

e) flowing molten electrically conductive material into the space relinquished by the removed trace material; and f) cooling the molten electrically conductive material to fabricate the ceramic micro-electromechanical part with an electrically conductive trace.

2. The method for fabricating a ceramic micro-electromechanical part according to claim 1 wherein the sacrificial trace material is removed by etching.

3. The method for fabricating a ceramic micro-electromechanical part according to claim 1 wherein the sacrificial trace material is removed by increasing the temperature of the sintered ceramic part above the melting point of the sacrificial trace material.

4. The method for fabricating a ceramic micro-electromechanical part according to claim 1, wherein the sacrificial trace material is tungsten, or molybdenum, or tantalum.

5. A method for forming a ceramic micro-electromechanical part with an electrical trace, comprising the steps of:

a) forming a base onto which an electrical trace is to be placed;

b) placing a sacrificial material having a melting temperature greater than the sintering temperature of a ceramic material in the path to be taken by the electrical trace;

c) forming a green ceramic material around the sacrificial material;

d) sintering the assembly to densify the ceramic;

e) removing the sacrificial material; and f) pouring molten electrically conductive material into the path taken by the removed sacrificial material and allowing the molten material to harden so as to form the micro-electromechanical part with an electrical trace.

6. The method for forming a ceramic micro-electromechanical part according to claim 5 wherein the sacrificial material is removed by etching.

7. The method for forming a ceramic micro-electromechanical part according to claim 5 wherein the sacrificial material is removed by increasing the temperature of the sintered assembly to vaporize the sacrificial material.

8. The method for forming a ceramic micro-electromechanical part according to claim 5 wherein the sacrificial material is tungsten.

* * * * *